(12) United States Patent
Zhao et al.

(10) Patent No.: US 10,763,557 B2
(45) Date of Patent: Sep. 1, 2020

(54) BATTERY AND THERMAL MANAGEMENT DEVICE THEREOF, AND UAV HAVING THE BATTERY

(71) Applicant: SZ DJI TECHNOLOGY CO., LTD., Shenzhen (CN)

(72) Inventors: Tao Zhao, Shenzhen (CN); Wentao Wang, Shenzhen (CN); Lei Wang, Shenzhen (CN); Juncheng Zhan, Shenzhen (CN); Yuancai Liu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 306 days.

(21) Appl. No.: 15/455,824

(22) Filed: Mar. 10, 2017

(65) Prior Publication Data
US 2017/0187082 A1 Jun. 29, 2017

Related U.S. Application Data

(63) Continuation of application No. PCT/CN2014/090737, filed on Nov. 10, 2014.

(51) Int. Cl.
*H01M 10/655* (2014.01)
*H01M 10/613* (2014.01)
(Continued)

(52) U.S. Cl.
CPC ......... *H01M 10/655* (2015.04); *B64C 39/024* (2013.01); *B64D 27/24* (2013.01);
(Continued)

(58) Field of Classification Search
CPC ............ H01M 10/655; H01M 10/613; H01M 10/625; H01M 10/6555; H01M 2220/20;
(Continued)

(56) References Cited

U.S. PATENT DOCUMENTS

2011/0052960 A1 3/2011 Kwon et al.
2012/0301773 A1* 11/2012 Roepke ............... H01M 2/1077
429/120
(Continued)

FOREIGN PATENT DOCUMENTS

CN 201570548 U 9/2010
CN 202025828 U 11/2011
(Continued)

OTHER PUBLICATIONS

The World Intellectual Property Organization (WIPO) International Search Report for PCT/CN2014/090737 dated Jun. 17, 2015 8 Pages.

*Primary Examiner* — Stephen J Yanchuk
(74) *Attorney, Agent, or Firm* — Anova Law Group, PLLC

(57) ABSTRACT

A battery, a thermal management device of the battery, and an unmanned aerial vehicle having the battery are provided. The thermal management device comprises a heat conducting housing having a receiving cavity and configured to divide the receiving cavity into a plurality of cell compartments for receiving cells, and a heat conducting shelf mounted within the receiving cavity and configured to be in contact with at least one of the cells to conduct heat generated by the at least one of the cells. The heat conducting shelf is thermally connected with an inner wall of the receiving cavity and configured to conduct heat in the heat conducting shelf to the heat conducting housing.

10 Claims, 10 Drawing Sheets

(51) Int. Cl.
*H01M 10/625* (2014.01)
*H01M 10/6555* (2014.01)
*B64D 27/24* (2006.01)
*B64C 39/02* (2006.01)

(52) U.S. Cl.
CPC ....... *H01M 10/613* (2015.04); *H01M 10/625* (2015.04); *H01M 10/6555* (2015.04); *B64C 2201/042* (2013.01); *H01M 2220/20* (2013.01)

(58) Field of Classification Search
CPC .. B64C 39/024; B64C 2201/042; B64D 27/24
See application file for complete search history.

(56) References Cited

U.S. PATENT DOCUMENTS

| | | | | |
|---|---|---|---|---|
| 2013/0157101 | A1* | 6/2013 | Heise | H01M 10/6555 429/120 |
| 2015/0037662 | A1* | 2/2015 | Pinon | H01M 2/0237 429/179 |
| 2016/0111761 | A1* | 4/2016 | Kopra | H01M 2/1077 429/120 |

FOREIGN PATENT DOCUMENTS

| | | |
|---|---|---|
| CN | 102729224 A | 10/2012 |
| CN | 102983377 A | 3/2013 |
| CN | 103199315 A | 7/2013 |
| CN | 103928963 A | 7/2014 |
| CN | 103996807 A | 8/2014 |
| EP | 2337142 A1 | 6/2011 |
| JP | H02138858 U | 11/1990 |
| JP | 2001016706 A | 1/2001 |
| JP | 2001297740 A | 10/2001 |
| JP | 2002216726 A | 8/2002 |
| JP | 2003071774 A | 3/2003 |
| JP | 2007257901 A | 10/2007 |
| JP | 2009257901 A | 11/2009 |
| JP | 2010080450 A | 4/2010 |
| JP | 2012123997 A | 6/2012 |
| JP | 2012134092 A | 7/2012 |
| JP | 2012174971 A | 9/2012 |
| JP | 2012204129 A | 10/2012 |
| JP | 2012252958 A | 12/2012 |
| JP | 2013164969 A | 8/2013 |
| JP | 2013531573 A | 8/2013 |
| JP | 2013175360 A | 9/2013 |
| JP | 2013247024 A | 12/2013 |
| JP | 2013252733 A | 12/2013 |
| JP | 2014010939 A | 1/2014 |
| JP | 2014031118 A | 2/2014 |
| JP | 2014071956 A | 4/2014 |
| JP | 2014116193 A | 6/2014 |

* cited by examiner

BATTERY AND THERMAL MANAGEMENT DEVICE THEREOF, AND UAV HAVING THE BATTERY

CROSS-REFERENCE TO RELATED APPLICATION

This is a continuation application of International Application No. PCT/CN2014/090737, filed on Nov. 10, 2014, the entire contents of which are incorporated herein by reference.

TECHNICAL FIELD

The present disclosure relates to an energy storage device and, in particular, to a battery, a thermal management device of the battery, and an unmanned aerial vehicle (UAV) having the battery.

BACKGROUND

A power battery of a UAV when working may discharge at a high rate, generating a large amount of heat and leading to a significant temperature rise. In addition, the power battery of the UAV is often includes a plurality of cells connected in series and/or parallel. It is difficult for the heat inside the battery to dissipate. Further, the temperature within the battery is not uniform and the temperature at some locations can be very high, thereby further causing the battery to fade faster, shortening the life span thereof, and influencing safety performance thereof. Therefore, a thermal management device is needed to solve the problems of temperature rise and non-uniform temperature distribution in the cells.

A conventional power battery for UAV is generally made by directly stacking a plurality of cells, then cladding them using a thermal shrinkage gummed paper, and does not have a thermal management device.

At present, an automotive power battery has a thermal management device. For example, Tesla uses a liquid-cooled thermal management device, which includes a cooling pipeline arranged zigzag among the cells and uses a mixture of 50% water and 50% ethylene glycol as a cooling liquid. The cooling liquid flows within the pipeline to take away the heat generated by the battery.

A Volt car made by the General Motors also uses a similar liquid-cooled thermal management device. Metal heat sinks (with thickness of 1 mm) are arranged spaced apart between individual cells, with flow channel grooves engraved on the heat sinks. The cooling liquid may flow within the flow channel grooves and take the heat away.

A LEAF electric vehicle made by Nissan uses a passive battery thermal management device to reduce the amount of heat generated by the battery. For example, electrodes of the battery are optimized to reduce an internal impedance, a thickness of the battery is decreased (an individual cell has a thickness of 7.1 mm) to prevent the heat within the battery from accumulating.

However, a conventional power battery for UAV does not have a thermal management device. The liquid-cooled thermal management device for a conventional vehicle-mounted power battery comprises a cooling pipeline, a cooling liquid, and a management and control system, which are complex. A product cost and a maintenance cost are increased. For example, since the cooling liquid needs to be circulated, a power system needs to be equipped, increasing extra power consumption. Furthermore, the liquid-cooled thermal management device has a large weight and a large volume, increasing the power consumption and limiting an application thereof.

A conventional vehicle-mounted passive battery thermal management device has a high requirement on the battery, limiting the selection of the battery. Moreover, since a thin-body battery is used, whose electrodes have a small thickness, it leads to a poorer performance of magnification, and a higher cost of the whole thermal management device.

SUMMARY

In view of the above, the present disclosure provides a battery thermal management device that can be added to any power battery for use in an aerial vehicle to solve problems in the conventional technologies, such as the severe temperature rise in the battery and non-uniform temperature distribution among the cells, and a larger weight, a bigger volume, a higher power consumption and a higher cost of the battery.

In accordance with the present disclosure, there is provided a battery thermal management device comprising a heat conducting housing having a receiving cavity and configured to divide the receiving cavity into a plurality of cell compartments for receiving cells, and a heat conducting shelf mounted within the receiving cavity and configured to be in contact with at least one of the cells to conduct heat generated by the at least one of the cells. The heat conducting shelf is thermally connected with an inner wall of the receiving cavity and configured to conduct heat in the heat conducting shelf to the heat conducting housing.

As compared with a conventional heat dissipation technology for battery, the above described battery thermal management device has at least the following advantages:

(1) The above described thermal management device comprises a heat conducting housing having cell compartments. Inner walls of the cell compartments can be in thermal contact with cells received within the cell compartments, to conduct the heat generated by the cells to the inner walls of the cell compartments, then to an outer surface of the heat conducting housing from the inner walls of the cell compartments, such that a heat dissipation path is formed, thereby effectively controlling the temperature rise in the battery and improving a life span of the battery.

(2) The inner walls of a cell compartment of the heat conducting housing of the above described thermal management device may be in thermal contact with two adjacent cells simultaneously, to balance the heat transfer of the two adjacent cells, thereby eliminating the temperature difference between the two adjacent cells.

(3) The above described thermal management device utilizes the heat conducting housing and the inner walls of the cell compartments to perform autonomous heat conducting, without the need for a dynamical system, thereby avoiding an extra power consumption, and making the above described thermal management device smaller, lighter, and less expensive.

(4) The above described thermal management device mainly dissipates the heat from outside of the cells without any limitation on the performance of the battery, thus there is a little limitation on the selection of the battery.

In some embodiments, the heat conducting housing comprises a plurality of plate bodies jointly enclosing the receiving cavity.

In some embodiments, the heat conducting housing has a U-shaped structure, the plurality of plate bodies comprise a bottom plate and two side plates extending from two opposite ends of the bottom plate towards a same side of the bottom plate, the two side plates being perpendicular to the bottom plate, and two ends of the heat conducting shelf abut against the two side plates, respectively.

In some embodiments, the heat conducting housing is a first heat conducting housing, and the battery thermal management device further comprises a second heat conducting housing. The first and second heat conducting housings are clasped one on top of another to enclose the heat conducting shelf between the first and second heat conducting housings.

In some embodiments, the heat conducting housing has a box structure and is formed by splicing the plurality of plate bodies, the box structure having one opening.

In some embodiments, a thickness of the plate bodies is 0.05-5 mm.

In some embodiments, the plurality of plate bodies comprise at least one of a plate body with meshes, a solid plate body, a hollow plate body, a plate body with a honeycomb-like surface, a plate body formed by splicing hollow tubes, or a plate body with a concave and convex slot-like surface.

In some embodiments, a material of the heat conducting housing comprises at least one of aluminum, aluminum alloy, copper, copper alloy, silver, silver alloy, graphene, or carbon nanotube.

In some embodiments, the battery thermal management device further comprises an insulated heat conducting layer disposed on a surface of the heat conducting shelf for contacting the at least one of the cells.

In some embodiments, the insulated heat conducting layer comprises at least one of a heat conducting silica gel layer, a heat conducting adhesive tape, a heat conducting silicone grease layer, or a heat conducting electroplated medium layer.

In some embodiments, abutting surfaces are respectively provided on the heat conducting shelf and the inner wall of the receiving cavity at a connecting place at which the heat conducting shelf and the inner wall of the receiving cavity are connected with each other, to form a surface contact at the connecting place.

In some embodiments, the battery thermal management device further comprises a heat conducting layer sandwiched between the abutting surface of the heat conducting shelf and the abutting surface of the inner wall of the receiving cavity.

In some embodiments, the heat conducting layer comprises at least one of a heat conducting silica gel layer, a heat conducting adhesive tape, a heat conducting silicone grease layer, or a heat conducting electroplated medium layer.

In some embodiments, the heat conducting layer is fixedly disposed on the heat conducting shelf or the inner wall of the receiving cavity.

In some embodiments, the heat conducting shelf comprises a plurality of plate bodies comprising at least one of a plate body with meshes, a solid plate body, a hollow plate body, a plate body with a honeycomb-like surface, a plate body spliced by hollow tubes, or a plate body with a concave and convex slot-like surface.

In some embodiments, a thickness of the plate bodies is 0.05-1 mm.

In some embodiments, a material of the plate bodies comprises at least one of aluminum, aluminum alloy, copper, copper alloy, silver, silver alloy, graphene, or carbon nanotube.

In some embodiments, the heat conducting shelf comprises a main plate body configured to be in surface contact with the at least one of the cells, and two abutting plates extending from two opposite ends of the main plate body towards a same side of the main plate body, the two abutting plates being perpendicular to the main plate body.

In some embodiments, the heat conducting shelf comprises a plurality of main plate bodies configured to be in surface contact with the cells, and a plurality of abutting plates configured to be in contact with the inner wall of the receiving cavity. The plurality of main plate bodies are disposed spaced apart from and opposite to each other to form the cell compartments. Two opposite side edges of each of the abutting plates are respectively connected with ends of two adjacent main plate bodies that are opposite to each other, to connect the plurality of main plate bodies to form a folded structure bending alternately towards left and right.

In some embodiments, a size of the main plate body is substantially equal to a corresponding size of a corresponding one of the cells, such that the abutting plate is in surface contact with the corresponding one of the cells.

In some embodiments, the heat conducting shelf includes a frame and forms one of the cell compartments.

In some embodiments, a size of the frame is substantially equal to a corresponding size of a corresponding one of the cells such that the corresponding one of the cells are in surface contact with sidewalls of the frame.

Also in accordance with the present disclosure, there is provided a battery comprising any one of the above-described thermal management devices and the cells received respectively in the plurality of cell compartments. The heat conducting shelf is configured to conduct heat generated by the cells to the heat conducting housing, and the heat conducting housing is configured to perform a heat exchange.

In some embodiments, the cells are arranged in sequence and spaced apart by the heat conducting shelf.

Also in accordance with the present disclosure, there is provided an unmanned aerial vehicle (UAV), comprising a body provided with a battery cabin and any one of the above described battery disposed within the battery cabin.

In some embodiments, the UAV further comprises a battery positioning mechanism configured to detachably fix the battery within the battery cabin.

In some embodiments, the battery positioning mechanism comprises a concave portion provided on an outside of a housing of the battery, a snap member matching the concave portion, and a pull rod binge connected with the battery cabin. The pull rod comprises a push-out arm configured to abut against the battery when the battery is plugged in the battery cabin, and a driving arm configured to drive the push-out arm to rotate about hinge point of the pull rod and the battery cabin to push the battery out of the battery cabin.

In some embodiments, the snap member comprises a connecting rod disposed rotatably on the battery cabin, a spherical snap head disposed at an end of the connecting rod, and an elastic reset member disposed between the connecting rod and the battery cabin. The elastic reset member is configured to provide an elastic force to the connecting rod to snap the snap head and the concave portion, and the snap head is configured to slip out of the concave portion when the battery is subject to a force exceeding a preset value.

In some embodiments, the snap member comprises a connecting rod, a hook provided at the one end of the connecting rod, and an elastic reset member is disposed between the connecting rod and the battery cabin. The one end of the connecting rod protrudes out of the battery cabin, and a middle section of the connecting rod is connected rotatably with the battery cabin. The elastic reset member is configured to provide an elastic force to the connecting rod to snap the hook and the concave portion. The connecting rod is configured to disengage the hook from the concave portion when another end of the hook distal from the hook is pressed.

Also in accordance with the present disclosure, there is provided a battery thermal management device comprising a heat conducting housing and a plurality of cell compartments provided within the housing. Each of the cell compartments is configured to receive a corresponding cell and at least one inner wall of each of the cell compartments is configured to be in contact with the corresponding cell to conduct heat generated by the corresponding cell.

In some embodiments, the at least one inner wall of each of the cell compartments is configured to be in surface contact with the corresponding cell.

In some embodiments, each of the cell compartments comprises two pairs of inner walls disposed opposite to each other, and a spacing between at least one of the two pairs of inner walls is equal to a corresponding size of the corresponding cell to sandwich the corresponding cell between the at least one of the two pairs of inner walls.

In some embodiments, the plurality of cell compartments are in a stacked arrangement.

In some embodiments, a material of the heat conducting housing comprises at least one of aluminum, aluminum alloy, copper, copper alloy, silver, silver alloy, graphene, or carbon nanotube.

In some embodiments, each of the cell compartments comprises an insulated heat conducting layer disposed on an inner wall of the cell compartment that is in contact with the corresponding cell.

In some embodiments, the insulated heat conducting layer comprises at least one of a heat conducting silica gel layer, a heat conducting adhesive tape, a heat conducting silicone grease layer, or a heat conducting electroplated medium layer.

In some embodiments, the inner wall of the cell compartment comprises a plate body with meshes, a solid plate body, a hollow plate body, a plate body with a honeycomb-like surface, a plate body spliced by hollow tubes, or a plate body with a concave and convex slot-like surface.

In some embodiments, the cell compartments are in a spliced structure and a heat conducting layer is provided at a splicing place.

In some embodiments, the heat conducting layer comprises at least one of a heat conducting silica gel layer, a heat conducting adhesive tape, a heat conducting silicone grease layer, or a heat conducting electroplated medium layer.

In some embodiments, the heat conducting housing has a tube structure with two opening ends, and the cell compartments are through grooves having two ends extending respectively to the two opening ends of the heat conducting housing.

In some embodiments, the heat conducting housing has a box structure having an opening, and the cell compartments are recesses having one end extending to the opening of the heat conducting housing and another end extending to a bottom of the heat conducting housing.

In some embodiments, the heat conducting housing is a first heat conducting housing and the battery thermal management device further comprises a second heat conducting housing. The cell compartments are formed by splicing the first heat conducting housing and the second heat conducting housing.

In some embodiments, the first heat conducting housing comprises a first bottom plate and a plurality of first side plates disposed in parallel and spaced apart from each other, the first side plates being fixed perpendicularly on the first bottom plate.

In some embodiments, the second heat conducting housing comprises a second bottom plate and a plurality of second side plates disposed in parallel and spaced apart from each other, the second side plates being fixed perpendicularly on the second bottom plate.

In some embodiments, the first side plates comprise at least three first side plates. Two of the at least three first side plates are disposed respectively at two ends of the first bottom plate. The plurality of second side plates are disposed at a middle section of the second bottom plate. The plurality of second side plates and the plurality of first side plates are disposed alternately and spaced apart from each other.

In some embodiments, the first side plates comprise at least three first side plates. Two of the at least three first side plates are disposed respectively at two ends of the first bottom plate. The second heat conducting housing comprises a flat plate connected with the plurality of first side plates.

In some embodiments, the plurality of first side plates are disposed at a middle section of the first bottom plate, the second heat conducting housing has a U-shaped structure, two ends of the U-shaped structure are connected respectively with two ends of the first bottom plate, and the plurality of first side plates are connected with a bottom of the U-shaped structure.

Also in accordance with the present disclosure, there is provided a battery comprising any one of the above-described the thermal management devices and a plurality of cells received respectively in the plurality of cell compartments. Inner walls of the cell compartments are configured to conduct heat generated by the plurality of cells to an outer surface of the heat conducting housing, and the heat conducting housing is configured to perform a heat exchange.

Also in accordance with the present disclosure, there is provided an unmanned aerial vehicle (UAV) comprising a body provided with a battery cabin and the above-described battery disposed within the battery cabin.

In some embodiments, the UAV further comprises a battery positioning mechanism configured to detachably fix the battery within the battery cabin.

In some embodiments, the battery positioning mechanism comprises a concave portion provided on an outside of a housing of the battery, a snap member matching the concave portion, and a pull rod hinge connected with the battery cabin. The pull rod comprises a push-out arm configured to abut against the battery when the battery is plugged in the battery cabin, and a driving arm configured to drive the push-out arm to rotate about hinge point of the pull rod and the battery cabin to push the battery out of the battery cabin.

In some embodiments, the snap member comprises a connecting rod disposed rotatably on the battery cabin, a spherical snap head disposed at an end of the connecting rod, and an elastic reset member disposed between the connecting rod and the battery cabin. The elastic reset member is configured to provide an elastic force to the connecting rod to snap the snap head and the concave portion, and the snap head is configured to slip out of the concave portion when the battery is subject to a force exceeding a preset value.

In some embodiments, the snap member comprises a connecting rod, a hook provided at the one end of the connecting rod, and an elastic reset member is disposed between the connecting rod and the battery cabin. One end of the connecting rod protrudes out of the battery cabin, and a middle section of the connecting rod is connected rotatably with the battery cabin. The elastic reset member is configured to provide an elastic force to the connecting rod to snap the hook and the concave portion, and the connecting rod is configured to disengage the hook from the concave portion when another end of the hook distal from the hook is pressed.

BRIEF DESCRIPTION OF THE DRAWINGS

FIG. 10 is a cross sectional view of a local portion where a battery cabin of the UAV as shown in FIG. 9 lies on.

DETAILED DESCRIPTION OF THE EMBODIMENTS

Figure 1:
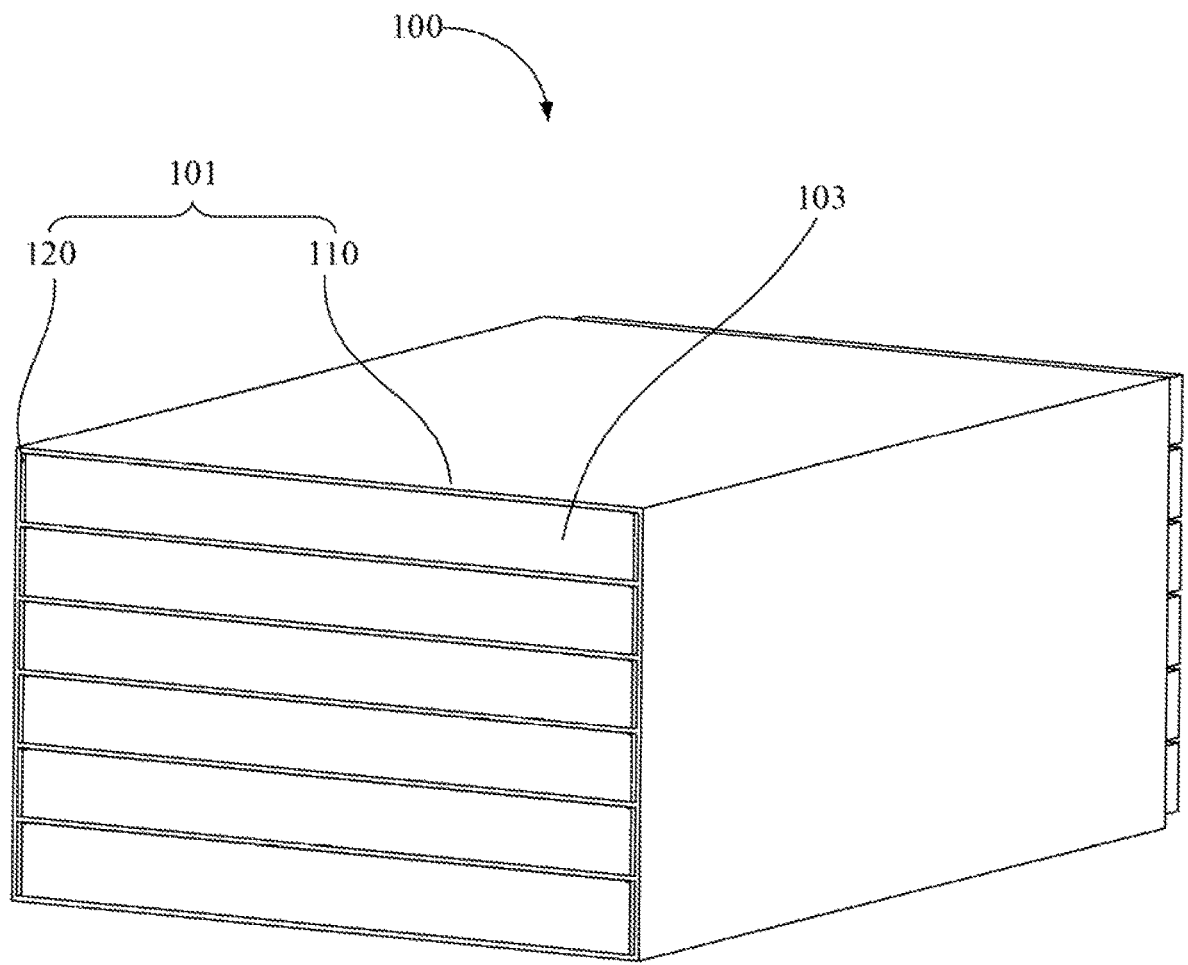
FIG. 1 is a perspective view of a battery according to an embodiment of the present disclosure.

The technical solutions of the present disclosure will be described in detail below in combination with the drawings in the embodiments of the present disclosure. It should be appreciated that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

It is noted that, when a component is referred to as "being fixed to" another component, the component may be directly on another component or an intermediate component might be present. When one component is considered as "being connected to" another component, the one component may be connected directly to another component or an intermediate component might be present simultaneously. As used herein, terms 'perpendicular', 'horizontal', 'left', 'right' and similar expressions are only for illustrative purposes.

Unless otherwise defined, all technical and scientific terms as used herein have the same meanings as those generally understood by persons of ordinary skill in the art. Terms used herein in the specification of the present disclosure are only for the purpose of describing specific embodiments, and are not intended to limit the present disclosure. The term 'and/or' used herein includes any and all combination(s) of one or more related listed item.

An embodiment of the present disclosure may provide a battery thermal management device. The thermal management device may comprise a heat conducting housing within which a plurality of cell compartments for receiving cells are provided. At least one inner wall of each cell compartment may be in contact with the cell received in the cell compartment, to conduct the heat generated by the cell.

In some embodiments, the heat of the cells is conducted to the inner walls of the cell compartments, and then conducted from the inner wall of the cell compartment to a housing portion of the heat conducting housing, such that a heat dissipation path is formed. Moreover, the inner wall of each cell compartment may conduct the heat generated by two adjacent cells simultaneously to reach thermal equilibrium.

In some embodiments, the thermal management device may be formed integrally. For example, the cell compartments are formed directly on the heat conducting housing.

In some embodiments, the thermal management device may also be formed by components. For example, the thermal management device comprises a heat conducting housing and a plurality of heat conducting shelves which are mounted within the heat conducting housing and form the plurality of cell compartments jointly with the heat conducting housing.

In some embodiments, each of the cell compartments may be a through slot with two openings or a recess with one opening.

In some embodiments, the inner wall of a cell compartment may have a plate-like structure of a certain form, such as a plate body with meshes, a solid plate body, a hollow plate body, a plate body with a honeycomb-like surface, a plate body formed by splicing hollow tubes, or a plate body with a concave and convex slot-like surface.

In some embodiments, the heat conducting housing may be made up of a material with a good heat conducting performance, such as aluminum, aluminum alloy, copper, copper alloy, silver, silver alloy, graphene, or carbon nanotube.

In some embodiments, an inner wall of the cell compartment is in surface contact with the cell to increase the heat conduction efficiency between the inner wall of the cell compartment and the cell.

In some embodiments, the inner wall of the cell compartment contacting the cell is provided with an insulating heat conducting layer, to improve the conduction efficiency between the inner wall of the cell compartment and the cell. The insulating heat conducting layer may be made of a material with a good heat conducting performance, such as a heat conducting silica gel layer, a heat conducting adhesive tape, a heat conducting silicone grease layer, and a heat conducting electroplated medium layer.

In some embodiments, the cell compartments are in a spliced assembled structure, and a heat conducting layer is provided at the place where two cell compartments join each other. The heat conducting layer may be made of a material that is the same as the insulating heat conducting layer on the inner walls of the cell compartments.

Base on the above described battery thermal management device, an embodiment of the present disclosure may further provide a battery which can serve as a power supply for an electric device, such as a power battery for an unmanned aerial vehicle (UAV).

Some embodiments of the present disclosure will be described in detail below in conjunction with the drawings.

Figure 2:
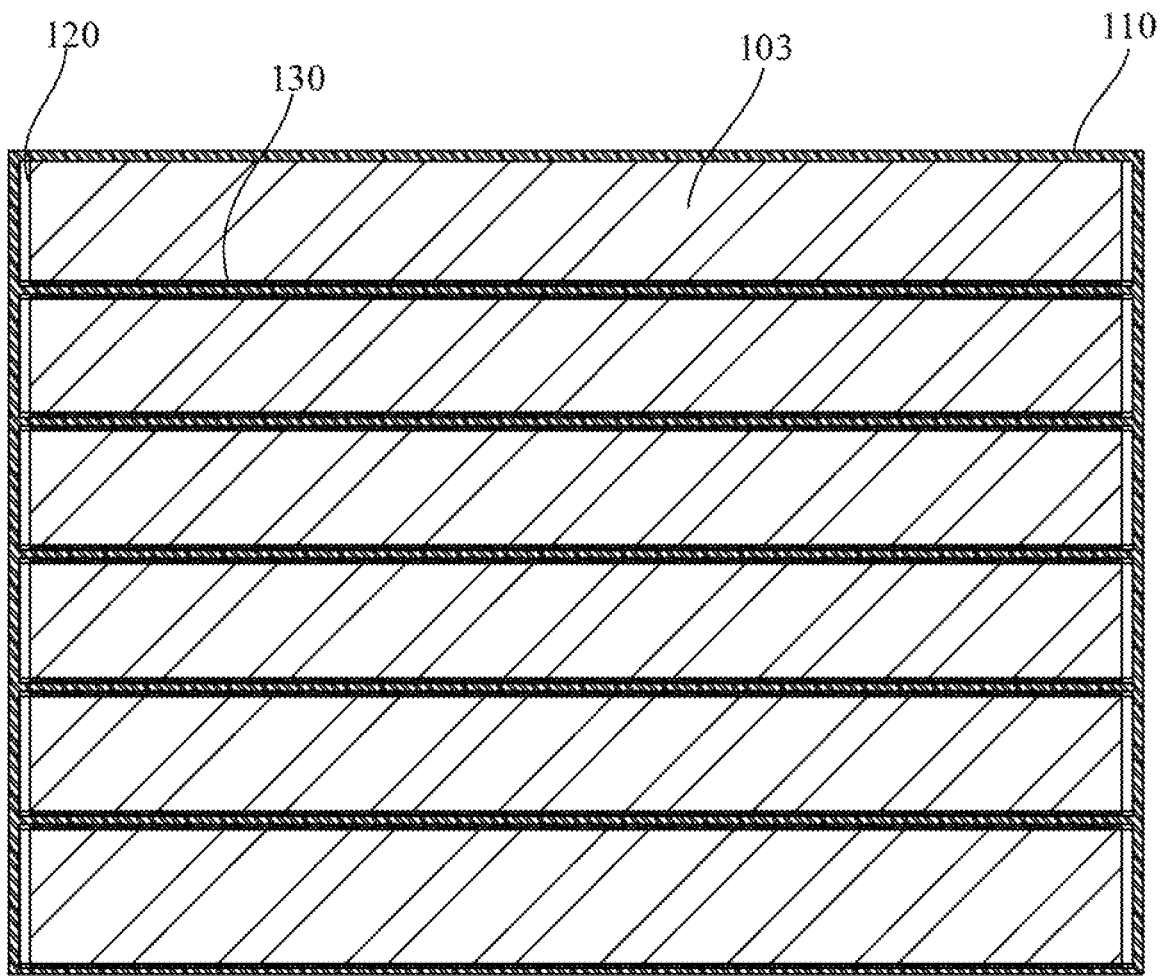
FIG. 2 is a cross sectional view of the battery as shown in FIG. 1 in an axial direction.

Referring to FIG. 1 and FIG. 2, a battery 100 according to an embodiment of the present disclosure may comprise a thermal management device 101 and cells 103. The thermal management device 101 may comprise a heat conducting housing 110 within which a plurality of cell compartments 120 for receiving the cells 103 are provided. At least one inner wall of a cell compartment 120 is configured to contact with the cell 103 received in the cell compartment 120 to conduct the heat generated by the cell 103.

The specific structure of the heat conducting housing 110 may be designed according to different requirements. For example, in the illustrated embodiment, the heat conducting housing 110 has a tube structure with two opening ends. The cell compartments 120 are through slots having two ends extending to the two opening ends of the heat conducting housing 110.

In some embodiments, the heat conducting housing 110 has a box structure with one opening. The cell compartments 120 are recesses having one end extending to the opening of the heat conducting housing 110 and the other end extending to a bottom of the heat conducting housing 110.

The heat conducting housing 110 may be made of a material with a good thermal conductivity, such as aluminum, aluminum alloy, copper, copper alloy, silver, silver alloy, graphene, or carbon nanotube.

The plurality of cell compartments 120 may be arranged according to different requirements. For example, in the illustrated embodiment, the plurality of cell compartments 120 are in a stacked arrangement, i.e., the cell compartments 120 are arranged one on top of another and parallel to each other.

A contact manner of each cell compartment 120 and the cell 103 received in the cell compartment 120 may be designed according to different requirements. In some embodiments, at least one inner wall of the cell compartment 120 is in surface contact with the cell 103. For example, in the illustrated embodiment, each cell compartment 120 comprises two pairs of inner walls that are disposed opposite to each other, and a spacing between at least one pair of inner walls is equal to a corresponding size of the cell 103, to sandwich the cell 103 between the at least one pair of inner walls.

Further, an insulated heat conducting layer 130 is provided on the inner wall of each of the cell compartments 120 that contacts the cell 103 received in the cell compartment 120. The insulated heat conducting layer 130 may be made of a material with a good thermal conductivity, such as a heat conducting silica gel layer, a heat conducting adhesive tape, a heat conducting silicone grease layer, or a heat conducting electroplated medium layer.

The inner wall of the cell compartment 120 may be a plate body of a certain shape, such as a plate body with meshes, a solid plate body, a hollow plate body, a plate body with a honeycomb-like surface, a plate body formed by joining hollow tubes, a plate body with a concave and convex slot-like surface, or the like.

Figure 3:
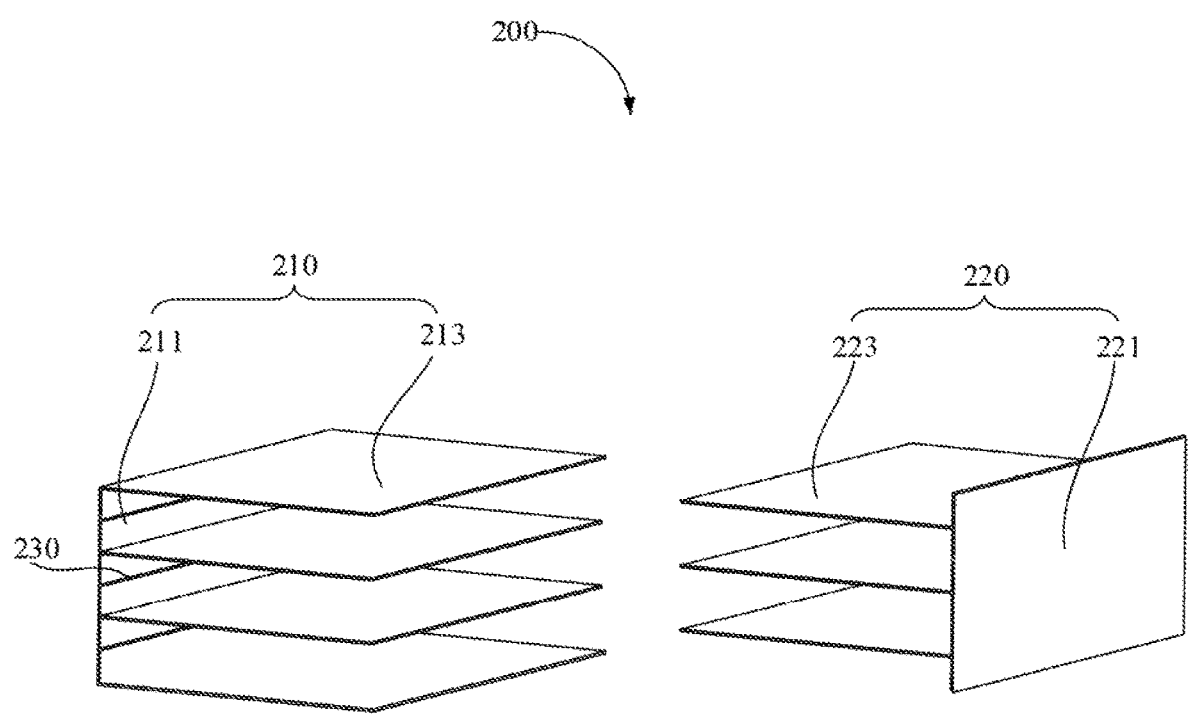
FIG. 3 is an exploded view of a battery according to another embodiment of the present disclosure.

Referring to FIG. 3, a battery 200 according to another embodiment of the present disclosure is similar to the battery 100 shown in FIGS. 1 and 2. The battery 200 differs from the battery 100 in that: the battery 200 comprises a first heat conducting housing 210 and a second heat conducting housing 220, and the cell compartments may be in a spliced structure. In some embodiments, the cell compartments are formed by splicing the first heat conducting housing 210 and the second heat conducting housing 220.

The first heat conducting housing 210 may comprise a first bottom plate 211 and a plurality of first side plates 213. The plurality of first side plates 213 are disposed in parallel and spaced apart from each other, and fixed perpendicularly on the first bottom plate 211. In the illustrated embodiment, at least three first side plates 213 are provided. Two of the at least three first side plates 213 are disposed at two ends of the first bottom plate 211, respectively.

The second heat conducting housing 220 may comprise a second bottom plate 221 and a plurality of second side plates 223. The plurality of second side plates 223 are disposed in parallel and spaced apart from each other, and fixed perpendicularly on the second bottom plate 221. In the illustrated embodiment, the plurality of second side plates 223 are disposed at middle section of the second bottom plate 221.

When the first heat conducting housing 210 and the second heat conducting housing 220 are assembled together, the first bottom plate 211 of the first heat conducting housing 210 is disposed in opposite to the second bottom plate 221 of the second heat conducting housing 220. The plurality of first side plates 213 of the first heat conducting housing 210 and the plurality of second side plates 223 of the second heat conducting housing 220 are disposed spaced apart from each other and alternately to jointly form the plurality of cell compartments.

It should be noted that, the specific structures of the above-described first heat conducting housing 210 and second heat conducting housing 220 are not limited to the above-described structures. For example, in some embodiments, the first heat conducting housing 210 comprises the first bottom plate 211, and the plurality of first side plates 213 which are disposed in parallel and spaced apart from each other and are fixed perpendicularly on the first bottom plate 211. Specifically, three first side plates 213 can be provided, with two of the at least three first side plates 213 being respectively disposed at two ends of the first bottom plate 211. The second heat conducting housing 220 may be a flat plate connected with the plurality of first side plates 213.

In some other embodiments, the first heat conducting housing 210 comprises a first bottom plate 211, and a plurality of first side plates 213 which are disposed in parallel and spaced apart from each other and are fixed perpendicularly at the middle section of the first bottom plate 211. The second heat conducting housing 220 has a U-shaped structure with two ends respectively connected with the two ends of the first bottom plate 211 of the first heat conducting housing 210. The plurality of first side plates 213 of the first heat conducting housing 210 are connected with the bottom of the second heat conducting housing 220.

In some embodiments, a heat conducting layer 230 may be provided at a splicing place at which the first heat conducting housing 210 splice with the second heat conducting housing 220. Thus, the heat conduction efficiency of the cell compartments can be further improved. In the illustrated embodiment, the heat conducting layer 230 is provided at each of the splicing places at which the plurality of first side plates 213 of the first heat conducting housing 210 splice with the bottom plate 221 of the second heat conducting housing 220 and the splicing places at which the plurality of second side plates 223 of the second heat conducting housing 220 splice with the bottom plate 211 of the first heat conducting housing 210.

The heat conducting layer 230 may be made of a material with a good heat conducting performance, such as a heat conducting silica gel layer, a heat conducting adhesive tape, a heat conducting silicone grease layer, a heat conducting electroplated medium layer, or the like.

Figure 4:
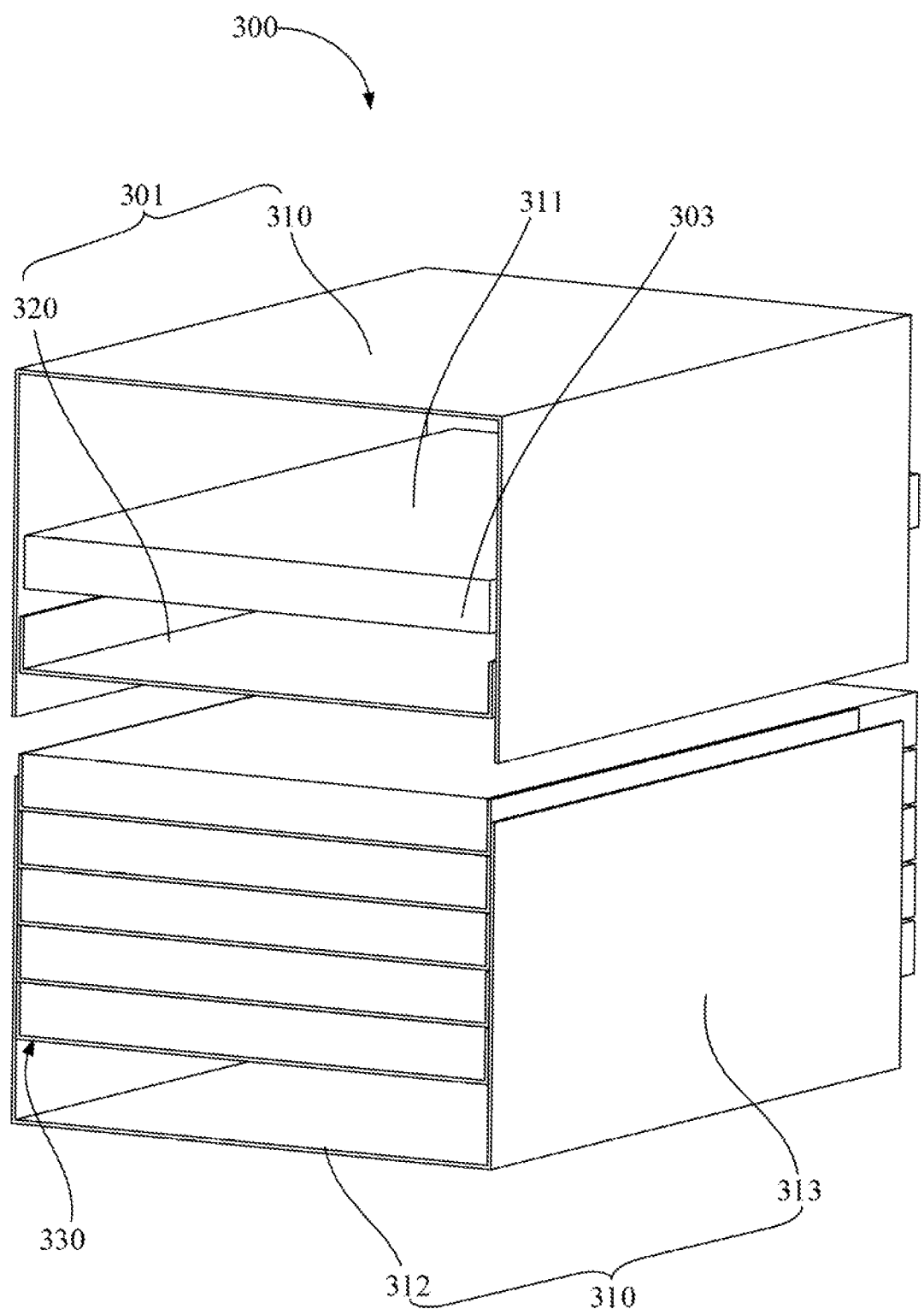
FIG. 4 is an assembled schematic diagram of a battery according to another embodiment of the present disclosure.
Figure 5:
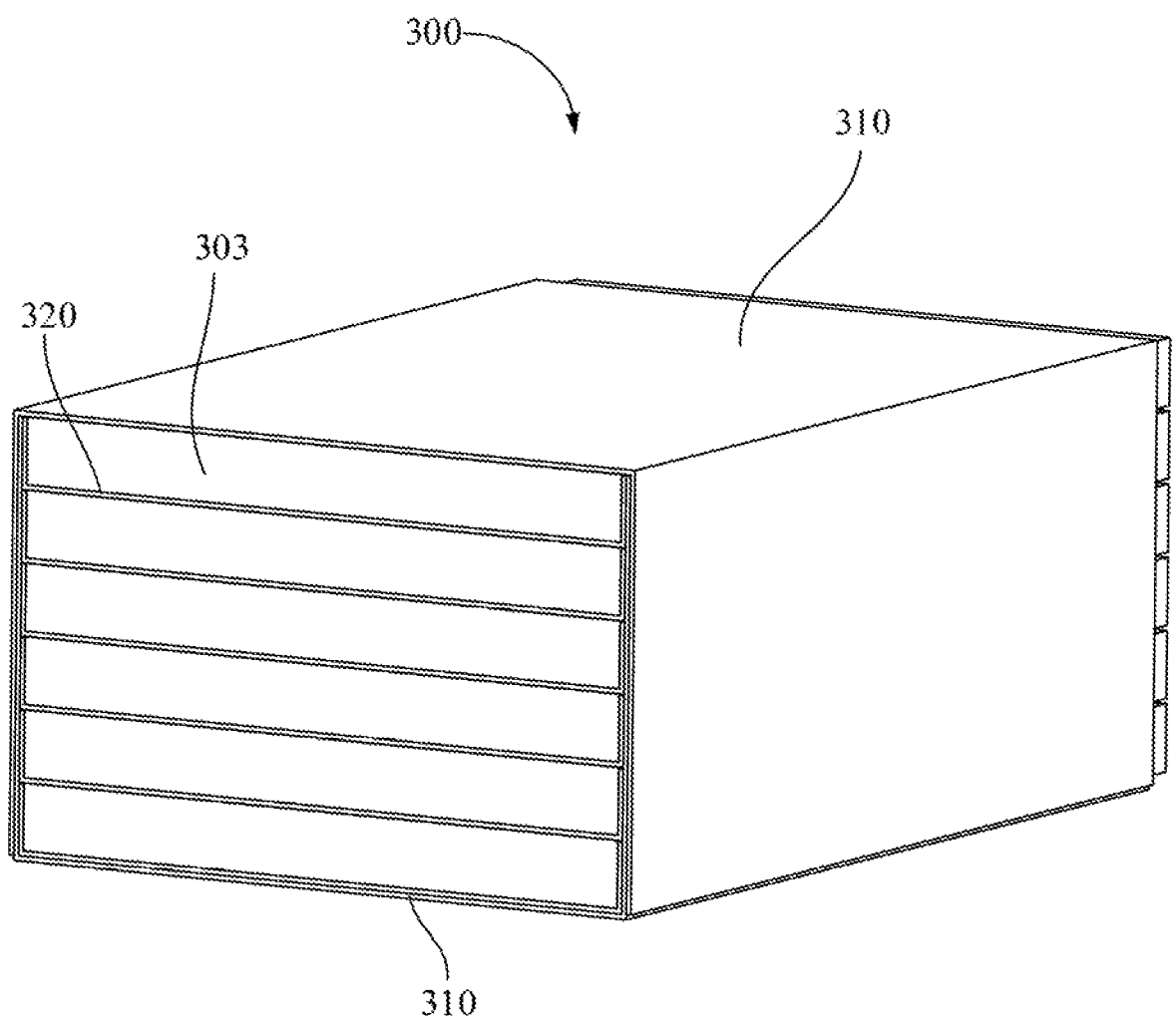
FIG. 5 is a perspective view of the battery as shown in FIG. 4.

Referring to FIG. 4 and FIG. 5, a battery 300 according to another embodiment of the present disclosure may comprise a thermal management device 301 and cells 303. The thermal management device 301 may comprise a heat conducting housing 310 and at least one heat conducting shelf 320.

The heat conducting housing 310 may have a receiving cavity 311 within which the at least one heat conducting shelf 320 is mounted. In some embodiments, the heat conducting shelf 320 is thermally connected with the receiving cavity 311 of the heat conducting housing 310, to enable the heat of the heat conducting shelf 320 to be conducted to the heat conducting housing 310. The heat conducting shelf 320 divides the receiving cavity 311 into a plurality of cell compartments 330 for receiving the cells 303 and can contact the cells 303 to conduct the heat generated by the cells 303.

The specific structure of the heat conducting housing 310 may be designed according to different requirements. For example, the heat conducting housing 310 comprises a plurality of plate bodies which jointly enclose the receiving cavity 311.

In the illustrated embodiment, the heat conducting housing 310 has a U-shaped structure. The plurality of plate bodies comprise a bottom plate 312, and two side plates 313 which extend perpendicularly from two opposite ends of the bottom plate 312, respectively, towards a same side of the bottom plate 312. Two ends of the heat conducting shelf 320 abut against the two side plates 313, respectively.

In some embodiments, two heat conducting housings 310 are provided one on another. The two heat conducting housings 310 are clasped together to enclose the at least one heat conducting shelf 320 between the two heat conducting housings 310.

In some embodiments, the heat conducting housing 310 may have a box structure formed by splicing a plurality of plate bodies. The box structure has an opening.

The thickness of a plate body of the heat conducting housing 310 may be designed according to actual requirements. In some embodiments, the thickness of the plate body of the heat conducting housing 310 may be 0.05-5 mm, such as 0.05 mm, 0.15 mm, 0.25 mm, 0.35 mm, 0.45 mm, 0.55 mm, 0.65 mm, 0.70 mm, 0.75 mm, 0.85 mm, 0.95 mm, 1.05 mm, 1.55 mm, 2.05 mm, 2.55 mm, 3.05 mm, 3.55 mm, 4.05 mm, 4.55 mm, or 5.0 mm.

The specific shape of a plate body of the heat conducting housing 310 may be designed according to different requirements. For example, the plate body may be a plate body with meshes, a solid plate body, a hollow plate body, a plate body with a honeycomb-like surface, a plate body formed by splicing hollow tubes, a plate body with a concave and convex slot-like surface, or the like.

The heat conducting housing 310 may be made of a material with a good thermal conductivity, such as aluminum, aluminum alloy, copper, copper alloy, silver, silver alloy, graphene, carbon nanotube, or the like.

The specific structure of the heat conducting shelf 320 may be designed according to different requirements. For example, the heat conducting shelf 320 comprises a plurality of plate bodies.

Figure 6:
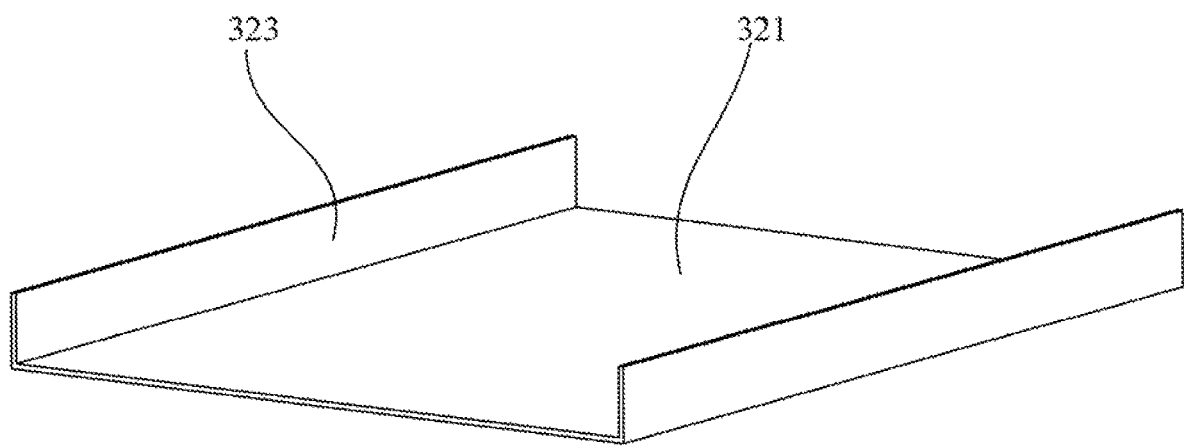
FIG. 6 is a perspective view of one of examples of a heat conducting shelf of the battery as shown in FIG. 4.

As shown in FIG. 6, in some embodiments, the heat conducting shelf 320 comprises a main plate body 321 configured to be in surface contact with a cell 303, and two abutting plates 323 which extend perpendicularly from two opposite ends of the main plate body 321, respectively, towards a same side of the main plate body 321.

Further, the size of the main plate body 321 is substantively equal to the corresponding size of the cell 303 such that the abutting plates 323 can be in surface contact with the cell 303. Since the abutting plates 323 are in surface contact with the cell 303, the contact area of the cell 303 with the cell compartments 330 is increased, thereby further improving the heat dissipation efficiency of the thermal management device 301.

Figure 7:
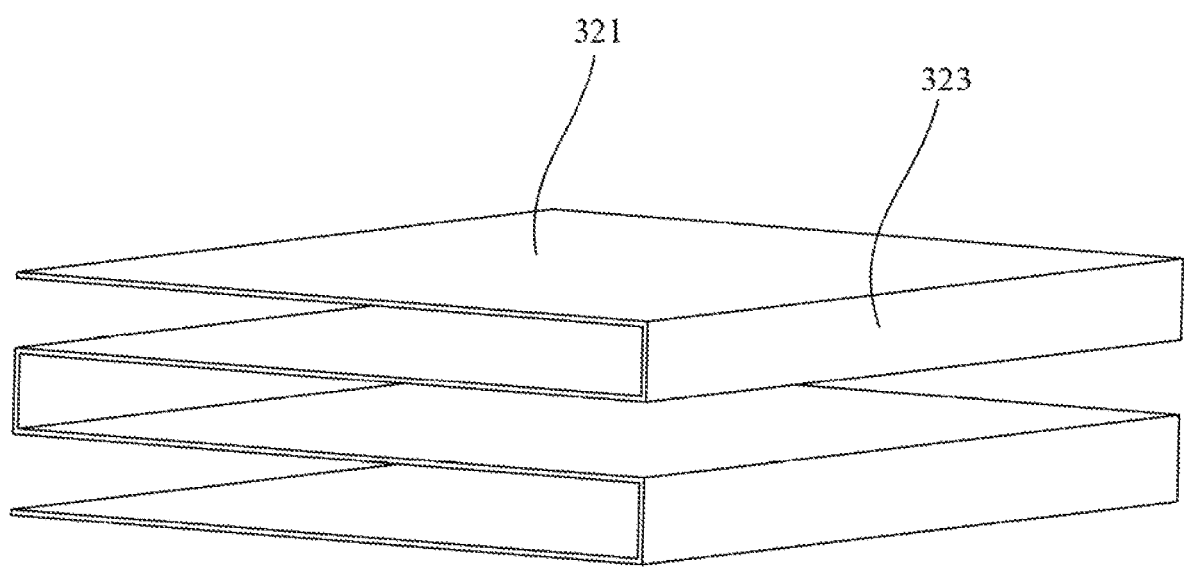
FIG. 7 is a perspective view of another example of the heat conducting shelf of the battery as shown in FIG. 4.

As shown in FIG. 7, in some other embodiments, the heat conducting shelf 320 comprises a plurality of main plate bodies 321 configured to be in surface contact with the cells 303, and a plurality of abutting plates 323 configured to be in contact with the inner wall of the receiving cavity 311. The plurality of main plate bodies 323 are disposed opposite to and spaced apart from each other, to form the cell compartments 330 for receiving the cells 303. Two opposite side edges of each abutting plate 323 are respectively connected with ends of two adjacent main plate bodies 321 that are opposite to each other, to connect the plurality of main plate bodies 321 to form a folded structure bent towards left and right alternately.

Further, the size of each main plate body 321 is substantially equal to the corresponding size of a corresponding cell 303, such that the abutting plate 323 is in surface contact with the cell 303. Since the abutting plate 323 is in surface contact with the cell 303, the contact area of the cell 303 with the cell compartment 330 is increased, thereby further improving the heat dissipation efficiency of the thermal management device 301.

Figure 8:
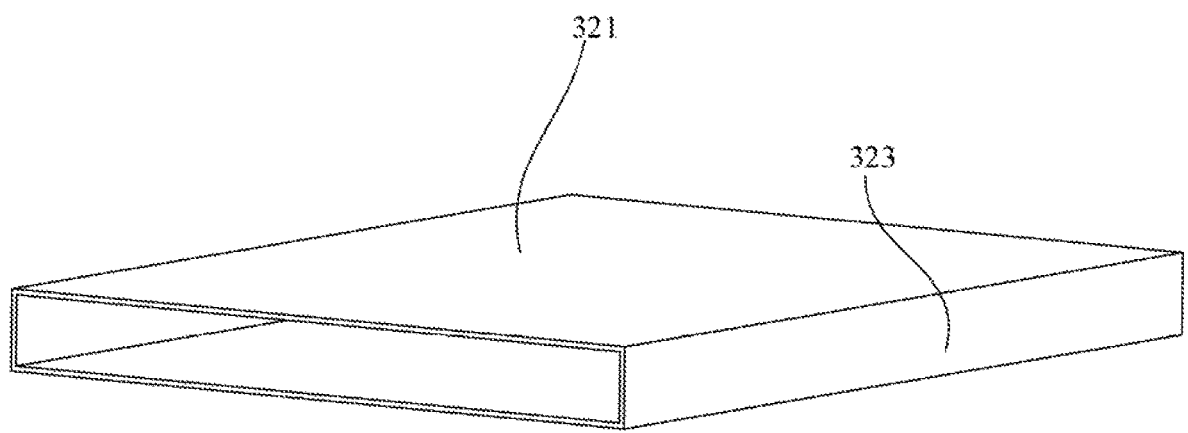
FIG. 8 is a perspective view of another example of the heat conducting shelf of the battery as shown in FIG. 4.

As shown in FIG. 8, in some other embodiments, the heat conducting shelf 320 includes a frame, and each heat conducting shelf 320 forms one cell compartment 330. Specifically, the frame is enclosed by two main plate bodies 321 and two abutting plates 323.

Further, the sizes of the frame are substantially equal to the corresponding sizes of the cell 303 such that the cell 303 is in surface contact with sidewalls of the frame. Since the cells 303 are each in surface contact with the sidewalls of the frame, the contact areas of the cells 303 with the cell compartments 330 are increased, thereby further improving the heat dissipation efficiency of the thermal management device 301.

The thickness of a plate body of the heat conducting shelf 320 may be designed according to actual requirements. In some embodiments, the thickness of the plate body of the heat conducting shelf 320 is 0.05-1 mm, such as 0.05 mm, 0.10 mm, 0.15 mm, 0.20 mm, 0.25 mm, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, or 1.0 mm.

The plate body of the heat conducting shelf 320 may be made of a material with a good thermal conductivity, such as aluminum, aluminum alloy, copper, copper alloy, silver, silver alloy, graphene, or carbon nanotube.

The plate body of the heat conducting shelf 320 may be a plate body of a certain shape, such as a plate body with meshes, a solid plate body, a hollow plate body, a plate body with a honeycomb-like surface, a plate body formed by splicing hollow tubes, a plate body with a concave and convex slot-like surface, or the like.

Further, the thermal management device 301 may also comprise an insulated heat conducting layer 130 disposed on a surface of the heat conducting shelf 320 that contacts the cell 303, to further improve the heat dissipation efficiency of the thermal management device 301.

The insulated heat conducting layer 130 may be made of a material with a good heat dissipation performance, such as a heat conducting silica gel layer, a heat conducting adhesive tape, a heat conducting silicone grease layer, a heat conducting electroplated medium layer, or the like.

The heat conducting shelf 320 may contact the heat conducting housing 310 in various manners, such as multipoint contact, linear contact, or surface contact. In the illustrated embodiment, the heat conducting shelf 320 and the heat conducting housing 310 are respectively provided with abutting surfaces at connecting places where the heat conducting shelf 320 and the inner walls of the receiving cavity 311 of the heat conducting housing 310 are connected, to form surface contacts at the connecting places of the heat conducting shelf 320 and the inner walls of the receiving cavity 311. In some embodiments, the abutting surface of the heat conducting shelf 320 is provided on the abutting plate 323 of the heat conducting shelf 320, and the abutting surface of the heat conducting housing 310 is provided on the side plate 313 of the heat conducting housing 310.

In some embodiments, the thermal management device 301 may further comprise a heat conducting layer sandwiched between the heat conducting shelf 320 and the abutting surface of the inner wall of the receiving cavity 311.

The heat conducting layer may be made of a material with a good heat dissipation performance, such as a heat conducting silica gel layer, a heat conducting adhesive tape, a heat conducting silicone grease layer, a heat conducting electroplated medium layer, or the like.

The heat conducting layer may be disposed in different manners according to different requirements. For example, the heat conducting layer may be fixedly disposed on the heat conducting shelf 320 or on the inner wall of the receiving cavity 311 of the heat conducting housing 310, to facilitate the assembly of the thermal management device 301.

The plurality of cells 303 may be received within the plurality of cell compartments 330, respectively. The heat generated by the cells 303 may be conducted to the heat conducting housing 310 via the heat conducting shelf 320, and heat exchange may be realized via the heat conducting housing 310.

The cells 303 may be arranged according to different requirements. For example, in the illustrated embodiment, the plurality of cells 303 may be arranged in sequence and separated from each other by the heat conducting shelves 320.

As compared with the conventional battery heat dissipation technologies, the above-described battery thermal management device has at least the following advantages.

(1) The above described thermal management device comprises a heat conducting housing having cell compartments. Inner walls of the cell compartments can be in thermal contact with cells received within the cell compartments, to conduct the heat generated by the cells to the inner walls of the cell compartments, then to an outer surface of the heat conducting housing from the inner walls of the cell compartments, such that a heat dissipation path is formed, thereby effectively controlling the temperature rise in the battery and improving a life span of the battery.

(2) The inner walls of a cell compartment of the heat conducting housing of the above described thermal management device may be in thermal contact with two adjacent cells simultaneously, to balance the heat transfer of the two adjacent cells, thereby eliminating the temperature difference between the two adjacent cells.

(3) The above described thermal management device utilizes the heat conducting housing and the inner walls of the cell compartments to perform autonomous heat conducting, without the need for a dynamical system, thereby avoiding an extra power consumption, and making the above described thermal management device smaller, lighter, and less expensive.

(4) The above described thermal management device mainly dissipates the heat from outside of the cells without any limitation on the performance of the battery, thus there is a little limitation on the selection of the battery.

Figure 9:
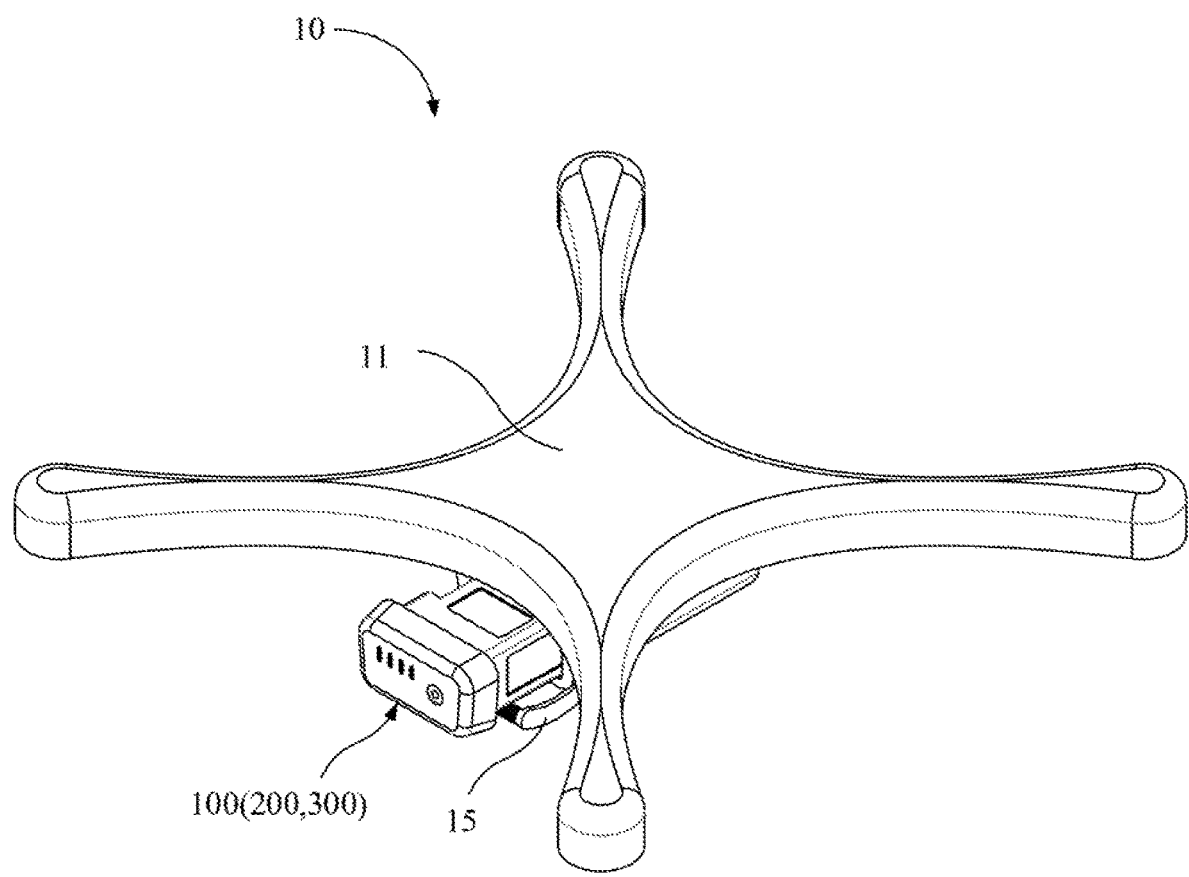
FIG. 9 is a state diagram of an unmanned aerial vehicle (UAV) when a battery is plugged in and out according to an embodiment of the present disclosure.
Figure 10:
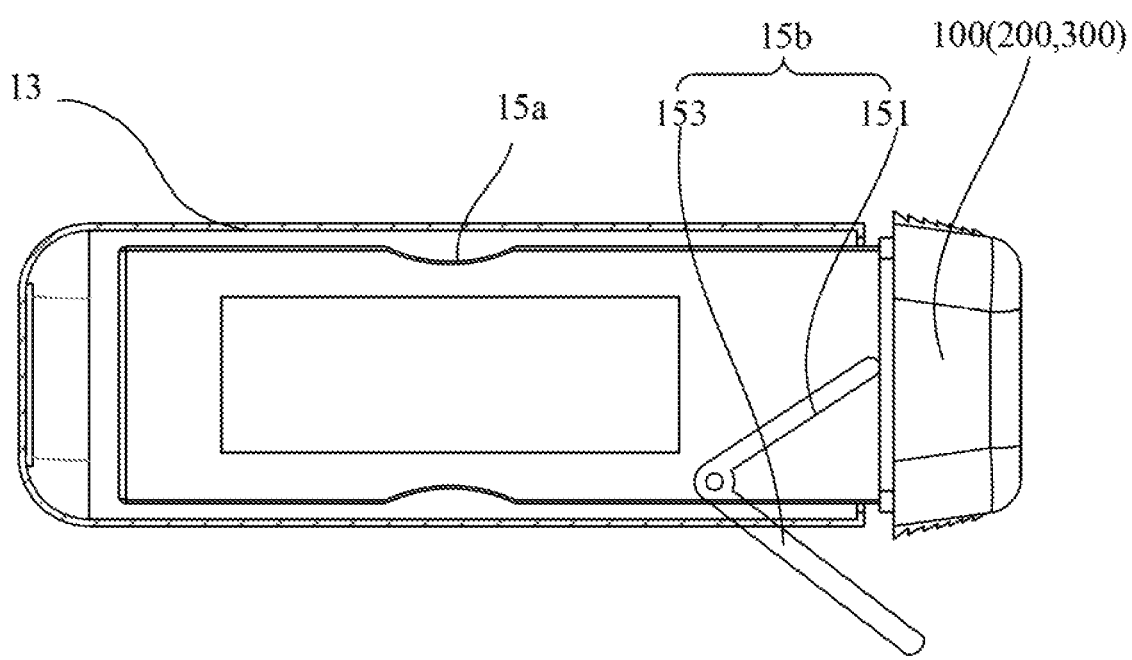

Referring to FIG. 9 and FIG. 10, based on the above described battery 100 (200, 300), an embodiment of the present disclosure may further provide a UAV 10 comprising a body 11 and the battery 100 (200, 300). The body 11 is provided with a battery cabin 13 within which the battery 100 (200, 300) is disposed.

The battery 100 (200, 300) may be mounted detachably within the battery cabin 13 of the body 11. For example, in some embodiments, the UAV 10 further comprises a battery positioning mechanism 15 by which the battery 100 (200, 300) is fixed detachably within the battery cabin 13.

The specific structure of the battery positioning mechanism 15 may be designed according to different requirements. For example, the battery positioning mechanism 15 comprises a concave portion 15a provided at the outside of the housing of the battery 100 (200, 300), a snap member matching the concave portion 15a, and a pull rod 15b hinge connected with the battery cabin 13. The pull rod 15b may comprise a push-out arm 151 which abuts against the battery 100 (200, 300) when the battery 100 (200, 300) are plugged in the battery cabin 13, and a driving arm 153 which is configured to drive the push-out arm 151 to rotate about a hinge point of the pull rod 15b and the battery cabin 13, such that the push-out arm 151 pushes the battery 100 (200, 300) out of the battery cabin 13.

The snap member may be unlocked automatically from the concave portion 15a on the outside of the housing of the battery 100 (200, 300). For example, in some embodiments, the snap member comprises a connecting rod and a spherical snap head which is provided at an end of the connecting rod. The connecting rod is disposed rotatably on the battery cabin 13, and an elastic reset member is provided between the connecting rod and the battery cabin 13. The elastic reset member provides an elastic force to the connecting rod, to snap the snap head and the concave portion 15a. The snap head, when subjected to a force that exceeds a preset value, slips automatically out of the concave portion 15a.

The snap member may be unlocked manually from the concave portion 15a on the outside of the housing of the battery 100 (200, 300). For example, in some embodiments, the snap member comprises a connecting rod and a hook provided at an end of the connecting rod, an end of the connecting rod protrudes out of the battery cabin 13, a middle section of the connecting rod is connected rotatably with the battery cabin 13, and an elastic reset member is provided between the connecting rod and the battery cabin 13. The elastic reset member provides an elastic force to the connecting rod to snap the hook and the concave portion 15a. When another end of the connecting rod distal from the hook is pressed, the book is disengaged from the concave portion 15a.

The foregoing description is merely for illustrating the embodiments of the disclosure, and is not intended to limit the scope of the disclosure. Any equivalent structural or flow variations made on the basis of the description and the drawings of the disclosure, and their direct or indirect applications to other relevant technical fields, shall all fall into the scope of the disclosure.

What is claimed is:

1. A kit for a battery thermal management device, comprising:

a heat conducting housing including a first U-shaped structure that forms a receiving cavity, and a second U-shaped structure; and a plurality of U-shaped heat conducting shelfs mounted in the receiving cavity, each of the U-shaped heat conducting shelfs including a main plate body extending parallel to a first direction and two abutting plates, wherein:

the two abutting plates extend perpendicularly from two opposite sides of the main plate body along a second direction perpendicular to the first direction to form a combined shelf together with the main plate body, the first U-shaped structure and the second U-shaped structure are clasped and movable along the second direction to form an adjustable space for receiving and mounting the combined shelf, the first U-shaped structure includes a first bottom plate and two first side plates extending perpendicularly from two opposite ends of the first bottom plate toward a same side of the first bottom plate along the second direction, the second U-shaped structure includes a second bottom plate and two second side plates extending perpendicularly from two opposite ends of the second bottom plate toward a same side of the second bottom plate along the second direction, a distance between the first bottom plate and the second bottom plate in the second direction is adjustable such that the adjustable space is adjustable along the second direction, the two first side plates of the first U-shaped structure are at least partially inserted into the second U-shaped structure, the two first side plate of the first U-shaped structure at least partially overlap with and abut against the two second side plates of the second U-shaped structure, respectively, the two abutting plates of each of the U-shaped heat conducting shells abut against the two first side plates of the first U-shaped structure, respectively, the main plate body of the combined shelf divides at least a portion of the receiving cavity into a plurality of cell compartments for accommodating and supporting two cells, the main plate body is disposed between the two cells, and opposite surfaces of the main plate body contact the two cells, respectively, and the first U-shaped structure is thermally connected with at least a portion of the combined shell to form a thermal path to conduct heat generated by the two cells to reach thermal equilibrium.

2. The kit for battery thermal management device of claim 1, wherein a thickness of each of the first bottom plate and the two first side plates is 0.05 mm - 5 mm.

3. The kit for battery thermal management device of claim 1, wherein each of the first bottom plate and the two first side plates comprises at least one of a plate body with meshes, a solid plate body, a hollow plate body, a plate body with a honeycomb- like surface, a plate body formed by splicing hollow tubes, or a plate body with a concave and convex slot-like surface.

4. The kit for battery thermal management device of claim 1, further comprising:

an insulated heat conducting layer disposed on one of the surfaces of the main plate body for contacting one of the two cells.

5. The kit for battery thermal management device of claim 1, further comprising:

a heat conducting layer sandwiched between one of the two abutting plates of each of the U-shaped heat conducting shelfs and a corresponding one of the two first side plates.

6. The kit for battery thermal management device of claim 5, wherein the heat conducting layer is fixedly disposed on the one of the two abutting plates or the corresponding one of the two first side plates.

7. The kit for battery thermal management device of claim 1, wherein a material of the first bottom plate and the two first side plates comprises at least one of aluminum, aluminum alloy, copper, copper alloy, silver, silver alloy, graphene, or carbon nanotube.

8. The kit for battery thermal management device of claim 1, wherein a size of the main plate body is substantially equal to a corresponding size of a corresponding one of the two cells, such that the two abutting plates are in surface contact with the corresponding one of the two cells.

9. An unmanned aerial vehicle (UAV) kit, comprising:

a body provided with a battery cabin; and a battery kit for disposing within the battery cabin, the battery kit comprising:

a heat conducting housing including a first U-shaped structure that forms a receiving cavity, and a second U-shaped structure; and a plurality of U-shaped heat conducting shelfs mounted in the receiving cavity, each of the U-shaped heat conducting shelfs including a main plate body extending parallel to a first direction and two abutting plates; and two cells, wherein:

the two abutting plates extend perpendicularly from two opposite sides of the main plate body along a second direction perpendicular to the first direction to form a combined shelf together with the main plate body, the first U-shaped structure and the second U-shaped structure are clasped and movable along the second direction to form an adjustable space for receiving and mounting the combined shelf, the first U-shaped structure includes a first bottom plate and two first side plates extending perpendicularly from two opposite ends of the first bottom plate toward a same side of the first bottom plate along the second direction, the second U-shaped structure includes a second bottom plate and two second side plates extending perpendicularly from two opposite ends of the second bottom plate toward a same side of the second bottom plate along the second direction, a distance between the first bottom plate and the second bottom plate in the second direction is adjustable such that the adjustable space is adjustable along the second direction, the two first side plates of the first U-shaped structure are at least partially inserted into the second U-shaped structure, the two first side plate of the first U-shaped structure at least partially overlap with and abut against the two second side plates of the second U-shaped structure, respectively, the two abutting plates of each of the U-shaped heat conducting shelfs abut against the two first side plates of the first U-shaped structure, respectively, the main plate body of the combined shelf divides at least a portion of the receiving cavity into a plurality of cell compartments for accommodating and supporting the two cells, the main plate body is disposed between the two cells, and opposite surfaces of the main plate body contact the two cells, respectively, and the first U-shaped structure is thermally connected with at least a portion of the combined shelf to form a thermal path to conduct heat generated by the two cells to reach thermal equilibrium.

10. A kit for a battery thermal management device, comprising:

a heat conducting housing including a first U-shaped structure that forms a receiving cavity, and a second U-shaped structure; and an S-shaped heat conducting shelf including an insertion element inserted in the receiving cavity, the insertion element having a folded structure of an S shape, wherein:

the first U-shaped structure and the second U-shaped structure are clasped along the direction to form an adjustable space for receiving and mounting the S-shaped heat conducting shelf, the adjustable space being adjustable along the direction, the first U-shaped structure includes a first bottom plate and two first side plates extending perpendicularly from 1v opposite ends of the first bottom plate toward a same side of the first bottom plate and the second U-shaped structure includes a second bottom plate and two second side plates extending perpendicularly from two opposite ends of the second bottom plate toward a same side of the second bottom plate, the two first side plates of the first U-shaped structure are at least partially inserted into the second U-shaped structure, the two first side plate of the first U-shaped structure at least partially overlap with and abut against the two second side plates of the second U-shaped structure, respectively, the S-shaped heat conducting shelf divides at least a portion of the receiving cavity into a plurality of cell compartments for accommodating and supporting two cells, a first portion of the S-shaped heat conducting shelf is disposed between the two cells, and opposite surfaces of the first portion of the S-shaped heat conducting shelf contact the two cells, respectively, and the first Li-shaped structure is thermally connected with at least a second portion of the S-shaped heat conducting shelf to form a thermal path to conduct heat generated by the two cells to reach thermal equilibrium.

* * * * *